United States Patent
Husband et al.

(10) Patent No.: US 9,231,444 B2
(45) Date of Patent: Jan. 5, 2016

(54) SUPERCONDUCTOR WINDING

(75) Inventors: Stephen M. Husband, Derby (GB); Alexander C. Smith, Holmfirth (GB)

(73) Assignee: ROLLS-ROYCE plc, London (GB)

( * ) Notice: Subject to any disclaimer, the term of this patent is extended or adjusted under 35 U.S.C. 154(b) by 701 days.

(21) Appl. No.: 13/286,424

(22) Filed: Nov. 1, 2011

(65) Prior Publication Data

US 2012/0115732 A1    May 10, 2012

(30) Foreign Application Priority Data

Nov. 10, 2010 (GB) .................................. 1018992.6

(51) Int. Cl.
*F16C 39/06* (2006.01)
*H02K 1/02* (2006.01)
*H02K 55/00* (2006.01)

(52) U.S. Cl.
CPC .................. *H02K 1/02* (2013.01); *H02K 55/00* (2013.01); *Y02E 40/62* (2013.01)

(58) Field of Classification Search
CPC ....................................................... H02K 1/02
USPC ......................................................... 505/166
See application file for complete search history.

(56) References Cited

U.S. PATENT DOCUMENTS

| | | |
|---|---|---|
| 5,140,290 A | 8/1992 | Dersch |
| 2003/0151408 A1* | 8/2003 | Kruspe et al. ................. 324/303 |
| 2004/0150901 A1* | 8/2004 | Hiebert et al. .................... 360/1 |
| 2006/0131978 A1* | 6/2006 | Hirzel et al. .................. 310/168 |
| 2007/0117478 A1* | 5/2007 | Frauenhofer et al. ............. 440/6 |
| 2008/0078474 A1* | 4/2008 | Naito et al. ................... 148/304 |
| 2009/0256430 A1* | 10/2009 | Farnia ............................ 310/44 |

FOREIGN PATENT DOCUMENTS

| | | |
|---|---|---|
| CN | 101567621 A | 10/2009 |
| GB | 1 573 101 | 8/1980 |
| JP | A-59-89567 | 5/1984 |
| JP | A-4-208061 | 7/1992 |

OTHER PUBLICATIONS

Mar. 8, 2011 Search Report issued in British Application No. GB1018992.6.

* cited by examiner

*Primary Examiner* — Paul Wartalowicz
(74) *Attorney, Agent, or Firm* — Oliff PLC

(57) ABSTRACT

This invention relates to a superconducting electrical machine, comprising: a superconducting winding at least partially surrounded by a magnetic flux guide, wherein the magnetic flux guide includes a binder loaded with a magnetic material.

14 Claims, 1 Drawing Sheet

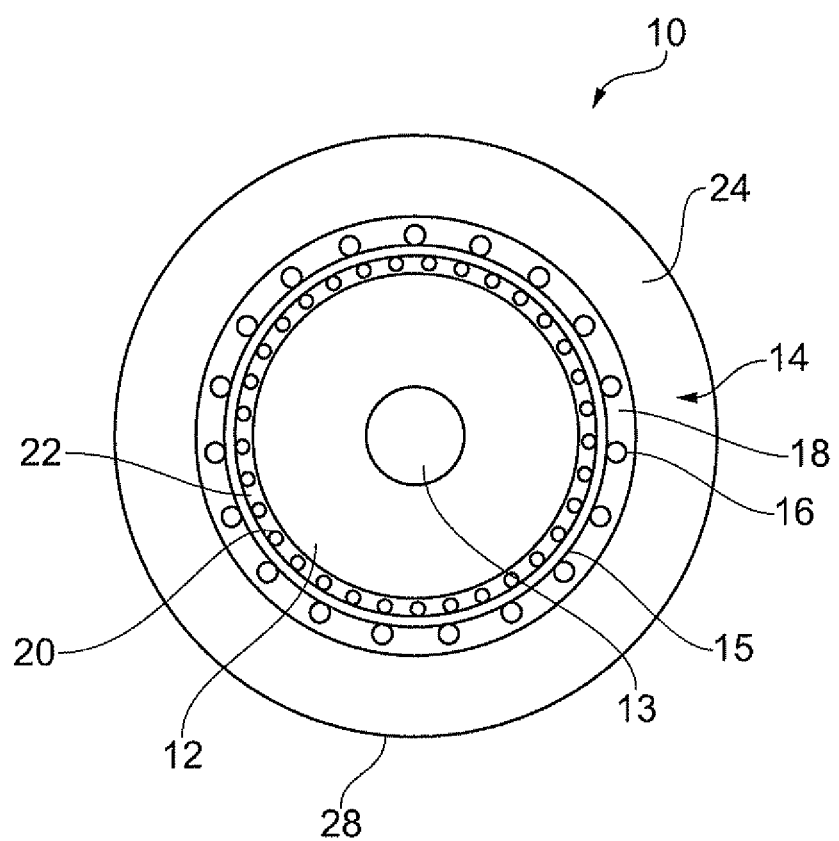

SUPERCONDUCTOR WINDING

This invention relates to a superconductor machine. In particular, this invention relates to a machine having a superconducting winding with a magnetic flux guide arrangement.

It is known to use superconductors in the rotors of electrical machines to provide higher magnetic fields than can be achieved with conventional copper windings or permanent magnets. Typically, electrical machines which employ superconducting rotors use air cored copper windings for the stator as the traditional ferromagnetic flux guides normally associated with electrical machines saturate and so are of limited use.

The present invention seeks to improve known superconducting machines.

In a first aspect the present invention provides a superconducting electrical machine, comprising: a superconducting winding at least partially surrounded by a magnetic flux guide, wherein the magnetic flux guide includes a binder loaded with a magnetic material.

The applicants have discovered that having superconductor windings in a stator made from a traditional flux guide made from steel laminations results in saturation effects which significantly limit the performance of the machine. Specifically, the large magnetic field produced by the superconductors magnetically saturates the steel which leads to pockets of increased magnetic field in the windings. If the magnetic field in one of these pockets exceeds the critical magnetic field of the superconductor the windings cease to be superconducting. Hence, the saturation of steel laminations effectively caps the current density which can be pushed through the windings. Although the current density which can be achieved is still comparatively greater than for a conventional copper winding, it is far below the theoretical potential which should be achievable with a superconductor winding.

One option to avoid the saturation is to use air cored superconductor windings as is done with conventional copper windings. However, superconductors, particularly high temperature superconductors, have a low strain tolerance which cannot provide the tangential mechanical force required for turning the rotor.

Having a magnetic flux guide made from a binder loaded with ferromagnetic particles provides support for the windings and provides some flux guidance without the saturation problems associated with steel laminations. The theory governing the improved performance with regard to the reduction in saturation side effects is not yet fully understood. Nevertheless, experimental data reveals an increased performance in superconducting machines of the present invention.

The electrical machine may be a motor. The electrical machine may be a generator. The motor or generator may be linear. Preferably, the motor or generator include a rotor. The superconductor winding may be part of the rotor. Preferably, the superconducting winding is a stator winding. The superconducting winding may be salient or lap. The skilled person will be familiar with other suitable superconducting winding configurations from the description of the invention.

The magnetic flux guide may be adjacent to the superconducting winding on a first side. For example, the magnetic flux guide may be a stator back iron. The superconducting winding may be partially enveloped by the magnetic flux guide. Preferably, the magnetic flux guide includes slots in which the superconducting winding is located.

The binder may be a dielectric material. The binder may be a polymer. Preferably, the binder is an epoxy. Having a dielectric material as the binder electrically isolates the magnetic particles and increases the resistivity of the magnetic flux guide so as to reduce eddy currents.

The resistivity of the magnetic flux guide may be between 700 and 12000 micro ohm meters.

The magnetic material may be ferromagnetic or ferrimagnetic. The magnetic material may be a powder which is suspended in the binder. The shape of the particles of powder may be any or a combination of the non-exhaustive group including: spherical, plate-like and stranded. Spherical is to be understood as generally round and include irregular particle shapes.

The largest particle diameter may be within a range having with an upper limit of 160 micrometers. The smallest particle diameter may be within a range having a lower limit of 5 micrometers.

The ferromagnetic may be an iron alloy. For example, the ferromagnetic material may be permalloy or supermalloy. Preferably, the ferromagnetic material is iron. Having a ferrimagnetic material increases the resistivity of the magnetic flux guide.

The superconductor winding may be a high temperature superconductor. Preferably, the superconductor is Magnesium Diboride.

The magnetic material included in the magnetic flux guide by volume may be in the range bounded by the values in the group consisting of 80%, 70%, 60%, 40%, 30%, 20% and 10%. For example, the magnetic material may be 70 to 80% by volume of the magnetic flux guide. Alternatively, the magnetic material may be 60% to 80% by volume of the magnetic flux guide. Preferably, the magnetic flux guide comprises between 10% and 30% magnetic material by volume.

The loading of the magnetic material in the magnetic flux guide may be uniform. Preferably, the loading of the magnetic material in the magnetic flux guide is non-uniform. For example, the stator may further comprise a pole face portion and a back iron portion located behind the windings and pole face portion relative to the pole face of the machine. The back iron portion may have a different proportion of magnetic material compared to the pole face portion. The magnetic material in the pole face portion of the magnetic flux guide may be in the range bounded by the values in the group consisting of 80%, 70%, 60%, 40%, 30%, 20% and 10%. The magnetic material in the back iron portion of the magnetic flux guide may be in the range bounded by the values in the group consisting of 80%, 70%, 60%, 40%, 30%, 20% and 10%.

Preferably, the magnetic material in the back iron portion comprises 60% magnetic material by volume. Preferably, the pole face portion comprises 25% magnetic material by volume.

The relative magnetic permeability of the material may be in the range bounded by the values in the group consisting of 5, 10, 20, 40, 80, 120 and 200. For example, the relative permeability may be in the range bounded by 5 and 20 or 20 and 120. Preferably, the relative magnetic permeability of the material is approximately 10.

The binder may be loaded with a non-magnetic material. The non-magnetic material may include a ceramic. Preferably, the binder is loaded with Alumina.

The non-magnetic material by volume in the magnetic flux guide may be in the range bounded by the values in the group consisting of 80%, 70%, 60%, 40%, 30%, 20% and 10%. For example, the non-magnetic material may be 70 to 80% by volume of the magnetic flux guide. Alternatively, the non-magnetic material may be 60% to 80% by volume of the magnetic flux guide. Preferably, the magnetic flux guide comprises 40% non-magnetic material by volume. As with the magnetic material, the non-magnetic material may be loaded by different amounts in the back iron portion and pole face portion. Preferably, the back iron is loaded with 20% Alumina. Preferably, the pole face portion is loaded with 40% Alumina.

The windings may be arranged axially around the circumference of a stator. The windings may include end portions. Preferably, the end portions are at least partially surrounded by a binder loaded with non-magnetic material particles. An embodiment of the invention will now be described with aid of the following FIGURE in which:

BRIEF DESCRIPTION OF THE DRAWING

FIG. 1 shows a schematic cross section of a superconducting electrical machine according to the present invention.

The electrical machine 10 is in the form of a cylindrical synchronous motor. The motor 10 includes a cylindrical rotor 12 within a corresponding cylindrical stator 14. The rotor and stator are arranged coaxially about the longitudinal axis of the motor 10 and are separated by an air gap 15. The rotor 12 is mounted on a shaft 13 which lies along the longitudinal axis so as to be rotatable within the stator 14.

The rotor 12 includes superconductor windings 20 which are arranged to be excited through a conventional brushless exciter (not shown) so as to provide a stationary (relative to the rotor) magnetic field in the air gap 15. The stator 14 includes superconducting windings 16 which are excited with an alternating current which provides a rotating magnetic field in the air gap 15. The rotating magnetic field interacts with the rotor magnetic field so as to rotate the rotor 12 on its shaft 13. The skilled person will appreciate that the motor 10 may also include other conventional means such as squirrel cage bars in the rotor 14 for damping purposes.

The rotor 12 and stator 14 include magnetic flux guides in the form of a binder loaded with a powdered magnetic material. The invention is described with reference to the stator. However, the skilled person will appreciate that the invention is equally applicable to the rotor 12.

The superconducting windings 16 are located within recesses in the form of elongate axial notches in the respective air gap facing circumferential surface magnetic flux The superconducting windings 16 are located within recesses in the form of elongate axial notches in the respective air gap facing circumferential surface magnetic flux guides 18. Hence, the superconducting windings 16 are partially enveloped by a magnetic flux guide 18. In use, the magnetic flux generated by the windings 16 is captured and channelled to provide a flux density across the air gap 15.

The magnetic flux guide 18 includes a binder in the form of an epoxy resin which is loaded with a powdered magnetic material in the form of iron powder. The epoxy resin is Stycast™ which is well suited to withstand the thermo-mechanical stress placed on the motor at cryogenic temperatures. The iron powder has a purity of approximately 99.9% and a distributed particle size of between 6 and 9 microns to provide a low eddy current loss. The particles are generally spherical.

The magnetic flux guide 18 of the stator includes two distinct portions: a pole face portion 22 and a back iron portion 24. The pole face portion 22 extends radially into the stator 14 from the stator pole face at the air gap 15 to beyond the rear side of the windings 16. The back iron portion 24 directly abuts pole face portion 22 and radially extends to a housing of the motor 10, which is not shown. The back iron portion principally acts to provide an electromagnetic shield against the high magnetic fields in the stator from leaking outside of the motor.

The back iron portion 24 and the pole face portion 22 are loaded with iron powder in a predetermined ratio by volume. Generally when considering magnetic circuits in electrical machines it is conventional to opt for a high relative permeability magnetic material (typically >1000) which operates below the saturation level for that material. In doing so, it is possible to guide nearly all of the available magnetic flux around the stator coil, 16, which maximises the flux density and thus the efficiency of the machine. In this vane, it stands to reason that the loading of the iron powder in the binder should be maximised so as to increase the relative permeability of the material and increase the magnetic flux density in the air gap 15.

However, the applicants have discovered the unexpected technical advantage that the lowering the loading of iron powder in the binder has a significant impact on the performance of the machine. Further, loading the pole face portion and back iron portion to different levels has an added advantage. Specifically, the applicants have found that lowering the loading of iron powder can result in an increased current density in the superconducting windings without the critical magnetic field and the superconductor quenching. The exact cause for the improvements in reduced and varying loadings is not fully understood at this time and is a matter for further investigation. Nevertheless, the applicants have found that the preferred value of loading in the stator pole portions is 25% by volume of iron powder and a preferred value in the back iron of 60% by volume.

With the above ratios the bulk relative permeability of the iron loaded epoxy resin in the stator pole pieces is approximately 10. The bulk relative permeability of iron loaded epoxy resin in the back iron portion is typically 300 (unsaturated).

The use of a binder loaded with magnetic material is also advantageous as it allows the introduction of other constituent materials into the magnetic flux guide 18. In the present embodiment, there is a thermal conduction modifier in the form of Alumina powder. Addition of Alumina allows the thermal response of the stator to be adjusted to provide for superior cooling of the superconductor windings 16 during use. As with the loading of the magnetic powder, the applicants have found that the loading of a thermal conduction modifier can be usefully varied throughout the stator to provide a superior thermal response. In use, the stator is cryogenically cooled via the outer surface of the stator 28 using techniques known in the art. The loading of Alumina powder in the present embodiment is 40% in the pole face portions and 20% in the back iron portion.

A further advantage of the binder is that the bulk material provides mechanical support for the superconducting windings 16. Machines of the prior art have avoided the use of superconductors in the stator as the previously accepted air cored windings would not be strong enough to provide the tangential mechanical force required to turn the rotor 12. That is, the rotor 12 exerts a force on the stator windings 16 which is equal and opposite to the rotational force of the rotor 12. With the use of a magnetic epoxy as provided within the present invention, the reactional force of the rotor 12 is against the magnetic epoxy.

The above described embodiment is not to be taken as a limitation of the invention.

The invention claimed is:

1. A superconducting electrical machine, comprising:
a superconducting winding at least partially surrounded by a magnetic flux guide,
wherein the magnetic flux guide includes a binder loaded with a magnetic material, and wherein the magnetic flux guide includes a pole face portion and a back iron portion having different loadings of magnetic material by volume;

wherein the relative magnetic permeability of the magnetic flux guide is between 5 and 20; and wherein the bulk relative permeability for the pole face portion is lower than the bulk relative permeability of the back iron portion.

2. A superconducting electrical machine, comprising:
a superconducting winding at least partially surrounded by a magnetic flux guide, the magnetic flux guide comprising:
a binder loaded with a magnetic material;
a pole face portion; and
a back iron portion, wherein the pole face portion and the back iron portion have different loadings of magnetic material by volume, and wherein the pole face portion and the back iron portion are loaded with iron powder in a predetermined ratio by volume so that the pole face portion has lower loading relative to the back iron portion.

3. A superconducting electrical machine as claimed in claim 2 wherein the binder is loaded with a non-magnetic material.

4. A superconducting electrical machine as claimed in claim 3 wherein the non-magnetic material is Alumina.

5. A superconducting electrical machine as claimed in claim 2, further comprising:
a stator and rotor, wherein the superconducting winding is a stator winding.

6. A superconducting electrical machine as claimed in claim 2, wherein the binder is an epoxy resin.

7. A superconducting electrical machine as claimed in claim 2, wherein the magnetic flux guide comprises between 10% and 30% magnetic material by volume.

8. A superconducting electrical machine as claimed in claim 2, wherein the back iron portion comprises between 50% and 70% magnetic material by volume.

9. A superconducting electrical machine as claimed in claim 2, wherein the pole face portion comprises between 20% and 30% magnetic material by volume.

10. A superconducting electrical machine as claimed in claim 2, wherein the relative magnetic permeability of the magnetic flux guide is between 5 and 20.

11. A superconducting electrical machine as claimed in claim 2 wherein the loading of the magnetic material in the magnetic flux guide is non-uniform.

12. A superconducting electrical machine as claimed in claim 2, wherein the binder is loaded with a non-magnetic material and wherein the back iron portion binder comprises between 10% and 30% non-magnetic material by volume.

13. A superconducting electrical machine as claimed in claim 2, wherein the binder is loaded with a non-magnetic material and wherein the pole face portion binder comprises between 30% and 50% non-magnetic material by volume.

14. A superconducting electrical machine as claimed in claim 2 wherein the superconducting windings include end portions which are at least partially surrounded by a binder loaded with non-magnetic material particles.

* * * * *